United States Patent [19]
Frisch

[11] Patent Number: 6,109,651
[45] Date of Patent: Aug. 29, 2000

[54] DEVICE FOR FASTENING A STEERING WHEEL TO A STEERING COLUMN

[75] Inventor: Ralph Frisch, Mömbris, Germany

[73] Assignee: TRW Automotive Safety Systems GmbH, Aschaffenburg, Germany

[21] Appl. No.: 09/082,578

[22] Filed: May 21, 1998

[30] Foreign Application Priority Data

May 24, 1997 [DE] Germany .............. 197 21 790

[51] Int. Cl.⁷ .................................................. B62D 1/10
[52] U.S. Cl. ............................................... 280/776; 74/552
[58] Field of Search ................................. 280/775, 776, 280/777; 74/552, 553, 554, 555, 556; 403/374.1

[56] References Cited

U.S. PATENT DOCUMENTS

| | | | |
|---|---|---|---|
| 5,144,861 | 9/1992 | Nishijima et al. | 74/552 |
| 5,713,245 | 2/1998 | Bobbitt, III et al. | 74/493 |
| 5,913,634 | 6/1999 | Heilig | 403/374.1 |
| 5,921,577 | 7/1999 | Weiss et al. | 280/775 |

FOREIGN PATENT DOCUMENTS

| | | |
|---|---|---|
| 0 685 379 A1 | 12/1995 | European Pat. Off. . |
| 295 18 638 U1 | 2/1996 | Germany . |
| 222662 | 10/1924 | United Kingdom . |

Primary Examiner—Eric Culbreth
Assistant Examiner—Tony Winner
Attorney, Agent, or Firm—Chadbourne & Parke LLP

[57] ABSTRACT

A device for fastening a steering wheel to a steering column, transmitting both torque and axial forces without play, whereby the end of the column and the hub of the wheel are designed to ensure form-fit transmission of torque at the site of their engagement. The device has a groove-like depression around the site of engagement on the column, the site of engagement on the hub comprises a stationary component and a component that pivots around it on an axis that parallels the axis of the column, the stationary component can be attached form-fit to the column, an elevation on the pivoting component that matches the groove-like depression and extends along at least part of it, and the pivoting component can be pivoted in two directions by a nut-and-bolt assembly installed axially non-displaceable in both the stationary component and the pivoting component, engaging and disengaging the elevation with the depression.

11 Claims, 1 Drawing Sheet

DEVICE FOR FASTENING A STEERING WHEEL TO A STEERING COLUMN

BACKGROUND OF THE INVENTION

The present invention concerns a device for fastening a steering wheel to a steering column, transmitting both torque and axial forces without play, whereby the end of the column and the hub of the wheel are designed to ensure form-fit transmission of torque at the site of their engagement.

Steering wheels are usually fastened to steering column by means of a conical component, serrations, and an outer thread at the upper end of the column and of another conical component and further serrations at the hub of the wheel. The wheel is mounted on the column at the correct angle and tensioned axially to the column with a nut such that the force fit deriving from the conical component is sufficient to transmit any torque that normally occurs. The serrations, the means of transmitting the torque form-fit, that is, only come into play when the force-fit connection is overloaded, in the event of an accident for example, or when the self-locking axial threaded connection would come loose.

Since no form-fit connection for the transmission of torque from a steering wheel to a steering column entirely without play that can be assembled at a justifiable expenditure and since such play is covered by manufacturing-dictated tolerances, it is the force-fit and not the form-fit components that must be relied on for the transmission of torque between the wheel and the column. The former, however, are not considered intrinsically adequate and must be augmented with form-fit components.

The aforesaid fastening methods assume that the steering wheel hub will be accessible from the front so that the nut can be screwed over the steering column. More and more vehicles are, however, being manufactured on an industrial scale with at least a driver's-side airbag that must be accommodated in the wheel, and the airbag module can generally be installed only once the wheel has been mounted on the column. This is not only relatively complicated, but also leads to fabrication problems, in that the airbags are sometimes installed not by their manufacturers or by the wheel manufacturers but only during final assembly of the motor vehicle. Furthermore, there is an increasing trend to produce steering-wheel covers as far as possible in one piece, leaving no way of fastening the wheel to the column by the aforesaid procedures.

SUMMARY OF THE INVENTION

The object of the present invention is accordingly a device that can be employed to fasten a steering wheel to a steering column without central access to the front of the wheel but without sacrificing the principle of mutually augmenting force-fit and form-fit connections.

This object is attained in accordance with the present invention by a groove-like depression around the site of engagement on the column, in that the site of engagement on the hub comprises a stationary component and a component that pivots around it on an axis that parallels the axis of the column, in that the stationary component can be attached form-fit to the column, by an elevation on the pivoting component that matches the groove-like depression and extends along at least part of it, and in that the pivoting component can be pivoted in two directions by a nut-and-bolt assembly installed axially non-displaceable in both the stationary component and the pivoting component, engaging and disengaging the elevation with the depression.

The axial tension for creating a force-fit connection is replaced in accordance with the present invention by an equivalent radial tension that requires no access from the front of the steering wheel to establish. The steering wheel can, rather, be fastened and unfastened from the rear by actuating the radial threaded connection with a socket wrench. The front of the wheel will accordingly be available without restriction for mounting an airbag, and a one-piece wheel cover can be applied at least to the front when the airbag is installed from the rear of the wheel.

Advantageous alternative versions and embodiments of the principle behind the present invention include the steering column secured by the nut-and-bolt assembly between the stationary and the pivoting component such as to constitute a force-fit connection for transmitting the torque and in that the form-fit components of the device participate in the transmission of force only when the force-fit components are overtaxed, the stationary component integrated into the steering-wheel hub, the pivoting component pivoting around a pin integrated into the steering-wheel hub or having a pin that engages a bore in the hub, the steering-wheel hub being a casting, the site of engagement of the steering column being provided with serrations and the stationary component being provided with matching serrations that extend over about half of the circumference of the column, recesses in the stationary component and in the pivoting component that accommodate the nut-and-bolt assembly such that it can not slip out and at least one of the recesses has a bore projecting axially away from the axis of the bolt, the nut-and-bolt assembly can be inserted into the recess in the stationary component across the axis of the bolt and, since the recess is mirror-symmetrical to the recess in the stationary component, the assembly will be permanently secured over the pin once the pivoting component has been inserted and secured, a washer between the head of the bolt and the pivoting component and another washer between the nut and the stationary component, the pivoting component being axially secured to the pin by a flush cap and the opening motion of the pivoting component being limited by a stop. Some embodiments will now be specified with reference to the accompanying drawing, wherein

DETAILED DESCRIPTION OF THE INVENTION

Figure 1:
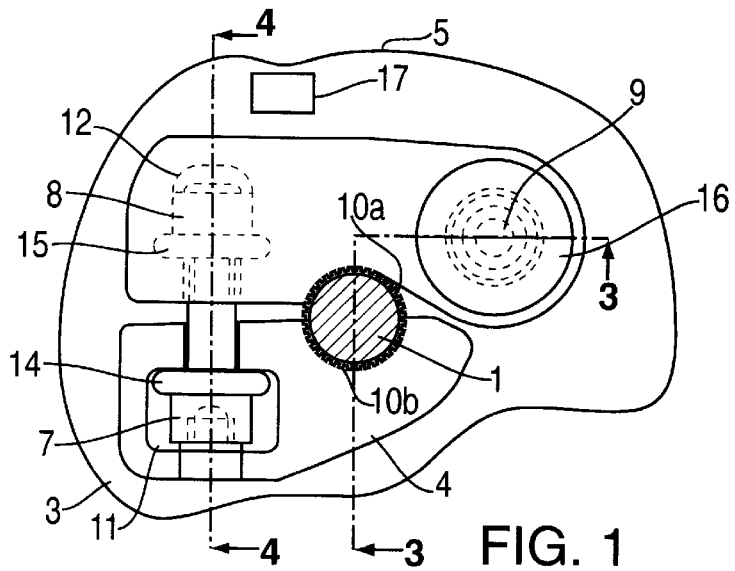
FIG. 1 illustrates part of a steering-wheel hub with a closed radial threaded connection as viewed from the rear of the wheel.
Figure 2:
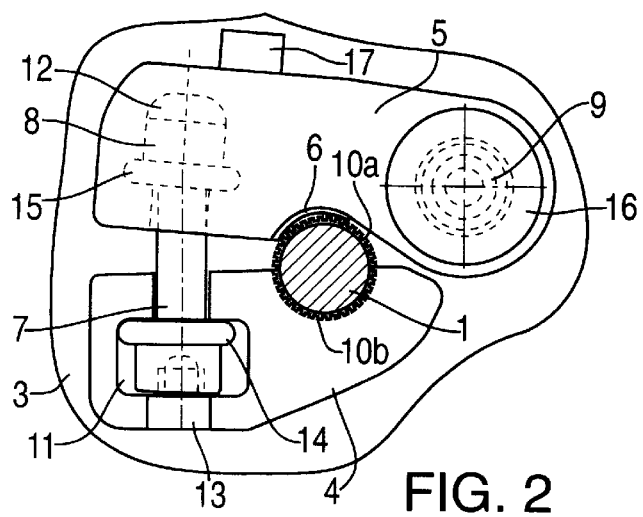
FIG. 2 illustrates part of a steering-wheel hub with an open radial threaded connection.
Figure 3:
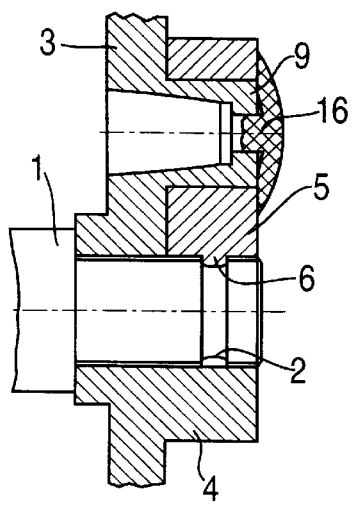
FIG. 3 is a section along the line A—A in FIG. 1
Figure 4:
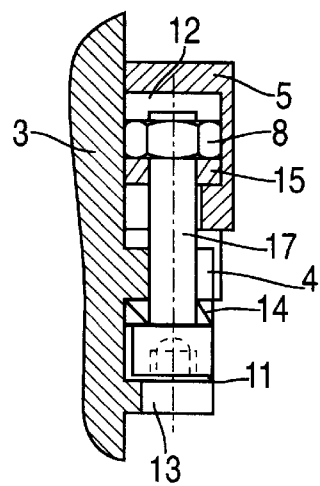
FIG. 4 is a section along the line B—B in FIG. 1.

FIGS. 1 through 4 show only the site of engagement of a steering-wheel hub 3 with a stationary component 4 and a pivoting component 5. Stationary component 4 is integrated into the hub 3. Pivoting component 5 pivots around a pin 9 that is itself integrated into the hub. The end of a steering column 1 has been provided by a known procedure with serrations 10a and is, as will be particularly evident from FIG. 3, surrounded by a groove-like depression 2. Stationary component 4 is provided with a semicircular depression with serrations 10b that engage the serrations 10a in column 1 when the parts are assembled. Pivoting component 5 is provided with the elevation 6 apparent in 6 that extends along part of the depression 2 in column 1. Elevation 6 engages depression 2 while the radially threaded connection is closed, constituting a form-fit axial connection in addition to the force-fit radial connection constituted by the closed threaded connection. Pivoting component 5 is secured axially to pin 9 by a flush cap 16. The closing direction of pivoting component 5 is limited by a clamping action and its opening direction by a stop 17. The radial threaded connection is established with a nut-and-bolt assembly 7 and 8 that fits into both a recess 11 in stationary component 4 and into another recess 12 in elevation 6. Since recesses 11 and 12 are mirror-symmetrical the head of bolt 7 can be inserted into stationary component 4 from outside, with the recess 12 in pivoting component 5 accommodating the other end of the bolt along with nut 8 once it has been positioned over pin 9. Nut-and bolt assembly 7 and 8 can accordingly not escape out of components 4 and 5. Assembly 7 and 8 can be actuated by a socket wrench inserted into the head of bolt 7 through a bore 13 projecting from the end of the bolt in stationary component 4. The mechanism is completed by washers 14 and 15. Washer 15 can be designed to prevent nut 8 from rotating unless other means are employed of securing it.

Nut-and bolt assembly 7 and 8 is inserted far enough into recesses 11 and 12 to establish enough assembly play to ensure that the rotation of bolt 7 will not only close the connection but also force pivoting component 5 open.

The device in accordance with the present invention provides a steering-wheel fastening at the rear of the wheel that will not only comply with all safety regulations but will also utilize additively operating form-fit components in accordance with the principle of a primary force-fit connections.

What is claimed is:

1. A device for fastening a steering wheel to a steering column having a groove in a surface where the column engages a hub of the steering wheel, transmitting both torque and axial forces without play, to ensure form-fit transmission of torque at the site of their engagement, wherein the site of engagement on the hub comprises a stationary component with respect to the hub the steering wheel and a component that pivots around an axis parallel to an axis of the column, wherein the stationary component can be attached form-fit to the column, an elevation integral with the pivoting component that matches the groove and extends along at least part of the groove, and wherein the pivoting component can be forcibly pivoted in two directions by a nut-and-bolt assembly installed axially non-displaceable in both the stationary component and the pivoting component, engaging and disengaging the elevation with the groove.

2. The device as in claim 1, wherein the steering column can be secured by the nut-and-bolt assembly between the stationary and the pivoting component such as to constitute a force-fit connection in addition to the form-fit connection, the force-fit connection being provided for transmitting the torque while the form-fit components of the device only participate in the transmission of force when the force-fit components are overtaxed.

3. The device as in claim 1 or 2, wherein the stationary component is integral with the steering-wheel hub.

4. The device as in claim 1 or 2, wherein the pivoting component pivots around a pin integral with the steering-wheel hub or has a pin that engages a bore in the hub.

5. The device as in claim 3, wherein the steering-wheel hub is a casting.

6. The device as in claim 1, wherein the site of engagement of the steering column is provided with serrations and wherein the stationary component is provided with matching serrations that extend over about half of the circumference of the column.

7. The device as in claim 1, further comprising recesses in the stationary component and in the pivoting component that are open in a direction parallel to the axis of the column and accommodate the nut-and-bolt assembly such that it can not slip out and wherein at least one of the recesses has a bore projecting axially away from the axis of the bolt.

8. The device as in claim 7, wherein the nut-and-bolt assembly can be inserted into the recess in the stationary component in a direction substantially perpendicular to the axis of the bolt and the recess in the stationary component is mirror-symmetrical to the recess in the pivoting component, such that the nut-and-bolt assembly will be permanently secured on the pin once the pivoting component has been inserted and axially secured.

9. The device as in claim 1, wherein the pivoting component is axially secured to the pin by a flush cap.

10. The device as in claim 1, wherein the opening motion of the pivoting component is limited by a stop provided on the hub of the wheel.

11. A device for fastening a steering wheel to a steering column, having a groove in a surface where the column engages a hub of the steering wheel transmitting both torque and axial forces without play, to ensure form-fit transmission of torque at the site of their engagement, wherein the site of engagement on the hub comprises a stationary component and a component that pivots around an axis parallel to an axis of the column, wherein the stationary component can be attached form-fit to the column, an elevation on the pivoting component that matches the groove and extends along at least part of the groove, and wherein the pivoting component can be pivoted in two directions by a nut-and-bolt assembly installed axially non-displaceable in both the stationary component and the pivoting component, engaging and disengaging the elevation with the groove, the device further comprising a first washer between the head of the bolt and the pivoting component and a second washer between the nut and the stationary component.

* * * * *